May 14, 1968
C. S. BOWYER
3,383,538
PROPORTIONAL COUNTER TUBE INCLUDING A PLURALITY
OF ANODE-CATHODE UNITS
Filed Dec. 30, 1965
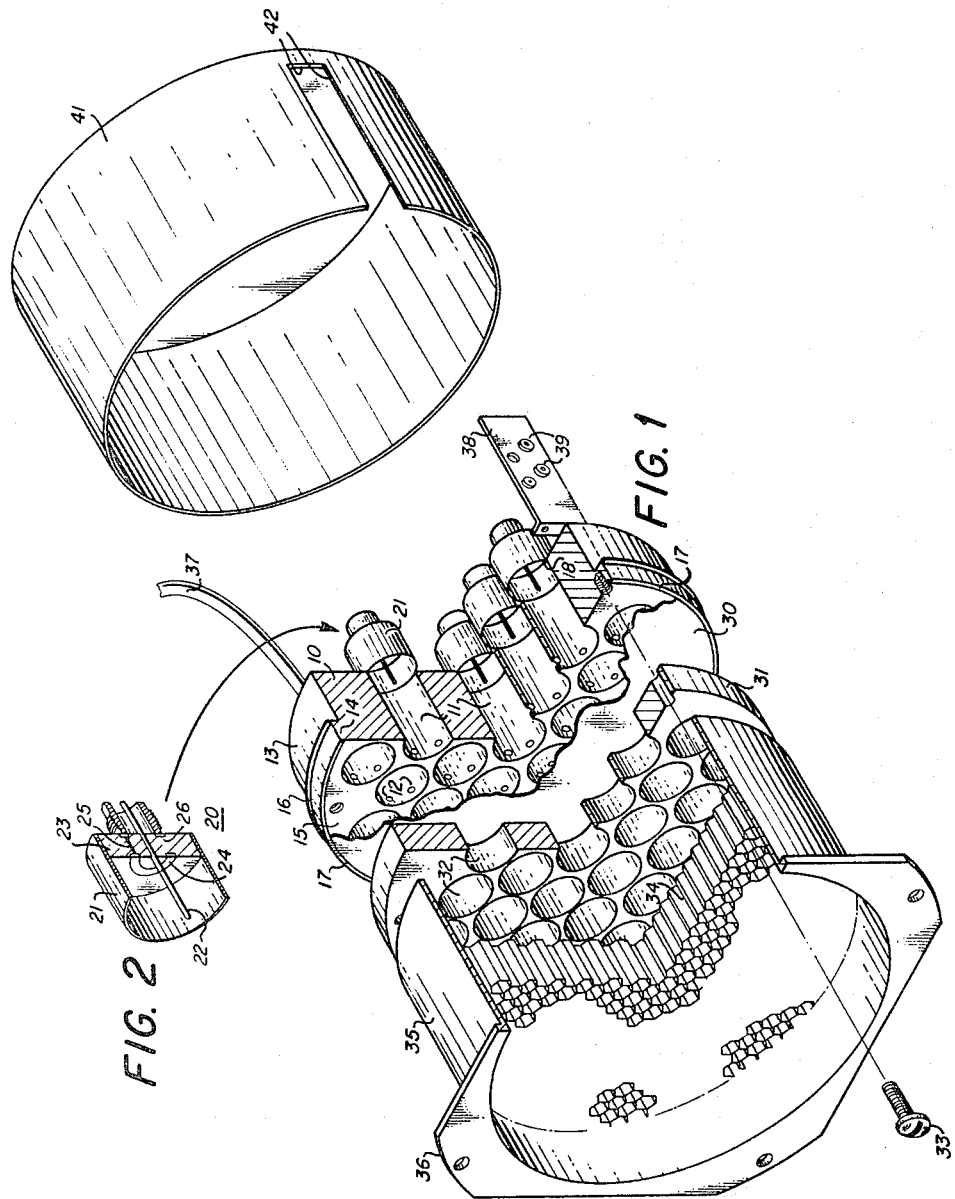
INVENTOR
CHARLES S. BOWYER
BY *Melvin L. Crane* AGENT
*R. S. Sciascia* ATTORNEY

United States Patent Office 3,383,538
Patented May 14, 1968

3,383,538
PROPORTIONAL COUNTER TUBE INCLUDING A PLURALITY OF ANODE-CATHODE UNITS
Charles S. Bowyer, Hyattsville, Md., assignor to the United States of America as represented by the Secretary of the Navy
Filed Dec. 30, 1965, Ser. No. 518,517
8 Claims. (Cl. 313—93)

ABSTRACT OF THE DISCLOSURE

This invention is directed to a proportional counter tube suitable for detecting low energy X-ray radiation in a range from 1 to 8 Angstrom units. The tube has a large window area for collecting radiation and includes a plurality of anode-cathode units that share a common gas supply within the tube. A honey-comb collimator positioned just above the window provides about 10 degrees total collimation of incoming radiation.

---

The invention described herein may be manufactured and used by or for the Government of the United States of America for governmental purposes without the payment of any royalties thereon or therefor.

The present invention is directed to a proportional counter for soft X-ray radiation and more particularly to a large collecting area proportional counter operable to detect X-ray radiation in a range from 1 to 8 angstrom units.

Today there is considerable interest in detecting X-ray radiation from outside the solar system. Such radiation is known to be of a very low intensity and heretofore has not been detected in such quantities as to provide a proper evaluation of such X-ray radiation. It has been determined that in order to obtain a statistically significant number of counts with low intensity radiation, one must have a large collecting area or a long intregation time or both. To obtain a reasonable signal to noise ratio this must be combined with a low cross section to cosmic radiation. Cosmic radiation when in sufficient amounts produces background noise; therefore, the detection area must be small to prevent detection of sufficient cosmic radiation to produce an unreasonable signal to noise ratio. Such information may be obtained by satellites or rocket borne astronomical instruments. Rocket borne astronomical instruments are commonly mounted looking out the side of the rocket and the roll and yaw of the rocket is utilized to scan the celestial sphere. With a typical roll rate of one roll in three seconds, the goal of a long intregation time is not possible. Thus, it has been determined that a proportional counter having a large collecting area must be provided to detect desired X-ray radiation in the 1 to 8 angstrom region. Heretofore, detection of soft X-ray radiation in the lower angstrom regions has not been possible.

The X-ray radiation detector of the present invention has been made of suitable configuration with simple construction to provide a device which is capable of being flown on a rocket or satellite and which is capable of detecting low intensity radiation.

It is therefore an object of the present invention to provide a low intensity radiation detector which is of simple construction.

Another object is to provide a sealed detector unit which is sufficiently small to be included in a rocket or satellite.

Still another object is to provide a low intensity X-ray radiation detecting device combined with a low cross section to cosmic radiation so as to provide a reasonable signal to noise ratio.

The nature of this invention as well as other objects and advantages thereof will be readily apparent from consideration of the following specification relating to the annexed drawing in which:

FIG. 1 is an exploded view partially cut away to show the relative elements of the device; and FIG. 2 is a cross-sectional view of one anode-cathode assembly.

Now referring to the drawing there is shown by illustration a proportional counter made in accordance with the present invention. As shown, the tube includes a main body 10 made from a cylindrical piece of brass or any other similar material. The body includes a plurality of longitudinal passages 11 which have radial passages 12 inter-connecting side by side longitudinal passages. The lower end 13 of the body is machined on the outer surface to provide a radial shoulder 14 of greater diameter than the bottom portion. The outer surface of the shoulder 14 is machined from the upper end 15 to provide a radial lip 16. The upper surface of the body is machined down to provide a longitudinal lip 17 thereon. Each of the longitudinal passages 11 are machined on the bottom surface to provide a shoulder 18 against which a cylindrical cathode 21 is secured when the tube is assembled.

FIG. 2 illustrates a cross-sectional view of the cathode-anode assembly 20 which includes an anode pin 22 that passes through a ceramic insulator 23. The ceramic insulator separates the anode from the cylindrical cathode 21. Radially of the anode pin, between the anode and cathode, a metal guard ring 24 is glazed onto the inside of the ceramic insulator and is electrically connected by a conductor 25 to a ring 26 on the bottom of the ceramic insulator about the anode pin. The cathode of separate anode-cathode assemblies are secured to the bottom of the body one each for each of the passages drilled longitudinally through the body. The cathode is secured to the body by any suitable means such as solder so long as the inner surface is a smooth connection with the inner surface of the passage 11.

A window 30 made of thin beryllium or any other suitable material is secured over the front of the body and bonded thereto by any well known method. A hold down plate 31 having passages 32 therethrough in axial alignment with the passages 11 in the body thereof is secured to the upper face of the body by suitable bolts or screws 33 and fits within the longitudinal lip 17 such that a vacuum tight fit is made between the beryllium window and the body of the counter tube. An aluminum honeycomb collimator 34 providing approximately 10 degree total collimation is secured within a cylindrical aluminum casing 35 which encloses the collimator. The aluminum casing slides down over the hold down plate 31 about the shoulder 14 and rests against the lip 16 on the shoulder thereof and is secured to the shoulder by any suitable means. The honeycomb collimator 34 secured within the aluminum casing 35 is secured in such a manner that the honeycomb is positioned over the hold down plate closely related thereto in axial alignment therewith. The aluminum casing is provided with a flange 36 at the upper end to secure the proportional counter within a rocket or to any other suitable means upon which the proportional counter is to be secured. A gas-filling tube 37 is also provided for filling the tube with a suitable gas depending on the use of the tube. Each of the plurality of anode, cathode, and the metal guard ring connections are electrically connected in parallel with each other, respectively, and the electrical connection is brought out to a strap 38 which is secured to the base of the tube and which is provided with suitable electrical connectors 39. A back cover 41 may be provided to enclose the anode-cathode assembly and is provided with a slot 42 therein which slides along the electrical connector strap connected to the bottom of the tube. The free space in and around the anode-cathode assemblies and wiring may be filled with Foamex (Foamex is a foamed latex which is a trademark of Firestone Tire & Rubber Co.) to reduce the chance of corona discharge occurring in use of the tube.

In order to prevent regions of high field strength the edges of the passages or holes through the body are rounded and the cathode anode assembly is secured to the body such that there is a smooth connection between the cathode and the body. Also, it has been determined for a correctly operating tube, the anodes should be polished. By polishing the anodes, large projections produced thereon in manufacturing are removed which increases the uniformity of gas gain of the counter tubes.

In making the tube, the body is milled to provide the shoulders on the upper end thereof and the lips thereon as described above. The holes or passages are drilled through the body and through the hold down plate such that the holes will have axial alignment when assembled together. The honeycomb collimator is secured within the aluminum casing and appropriate holes are then threaded in the respective parts for securing the hold down plate to the body and securing the aluminum casing honeycomb collimator to the body. A suitable hole is drilled into the body for reception of the gas filling tube. Then the passages through the body are rounded off such that there are no sharp protrusions extending therefrom. The anode-cathode assemblies are assembled together and then secured in their respective places in the body of the tube by any suitable means such as solder. Once the anode cathode assemblies are in place, the window is positioned in its proper place and the hold down plate is secured to the body to hold the window in place. Subsequently, the aluminum case including the honeycomb collimator is secured to the body. The electrical wiring is then connected respectively to the anode, the cathode, and the guard ring and brought out and connected electrically to the electrical connectors. The free space in and around the anode cathode assemblies and the wiring is then filled with Foamex and the bottom cover is then placed over the lower end of the body and secured to the main body. The proportional counter tube is now ready to receive a gas therein.

The tube is evacuated to a pressure of $10^{-7}$ torr for a period of approximately 12 hours while the unit is maintained at a temperature of about 50 degrees centigrade to facilitate out-gassing. Once the tube has been so evacuated, the tube is then filled with 370 torr P–10 gas (90% argon and 10% methane). The filling tube is then sealed by a cold weld pinch technique which is well known in the art.

A typical tube made in accordance to the above teaching, sensitive to X-ray radiation in the 1 to 8 Angstrom unit range, is made as follows: A body 15, about 15 centimeters in diameter is drilled to include 31 passages of about 19 millimeters in diameter each for the purpose of securing 31 anode cathode assemblies thereto. The inside diameter of the cathode being 19 millimeters such that the inner wall connection is continuous with the passage in the body. The window has a diameter of approximately 15 centimeters to enclose the upper end of the body and a thickness of about 0.127 millimeter to pass the X-radiation. The collimator is made of about 15 centimeters diameter and is made to provide approximately 10 degree total collimation. When assembled, the tube is evacuated to $10^{-7}$ torr and then filled with a P–10 gas (90% argon and 10% methane) at a pressure of about 370 torr.

In use, the counter is supplied with a high voltage of about 1800 volts by a regulated supply. The high voltage is filtered at the counter by an RC filter to reduce any pickup in the supply cable. The guard rings of the anode units have a high voltage of about 1800 volts applied thereto to eliminate possible sporadic dark current across the ceramic insulators. The signal is tken off a 470 pf. high voltage capacitor and fed to a low noise amplifier through 20 centimeters of shielded cable. The combination of cable and amplifier input produces a total of 50 pf. capacitance which is driven by the counter. The output of the amplifier is fed to a 3-channel pulse analyzer and then fed to a suitable telemetry system.

A proportional counter made in accordance with the above dimensions has a net weight of approximately 2.2 kilograms measuring 15 centimeters in diameter exclusive of the mounting flange which is of a greater diameter, and is approximately 20 centimeters long. The total window area of the counter is about 81.6 cm.$^2$. The collimator has a transmission of 80 percent giving an effective window area of 65.3 cm.$^2$. The described counter is capable of being mounted in the instrument section of a rocket and flown during a rocket flight for the purpose of detecting X-ray radiation in the 1 to 8 Angstrom unit range.

It would be obvious to one skilled in the art that other similar proportional counter tubes may be made with a plurality of anode-cathode assemblies in which a different gas at the same or at a different pressure and a window of a different material may be used such that the counter tube may detect radiation in a different Angstrom unit range.

Such a tube made in accordance to the teaching of the present invention provides a multi-anode-cathode tube which makes use of the same gas within the counter tube structure for all anode-cathode assemblies. The radial passages inter-connecting the many axial passages permits the gas to be circulated throughout the counter over each of the anode-cathode arrangements.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A proportional counter tube structure which comprises;
   a main body,
   a plurality of longitudinal passages through said body,
   at least one passage interconnecting each of the adjacent longitudinal passages,
   a radiation transparent window secured over one end of said body enclosing all of said plurality of longitudinal passages,
   a cylindrical cathode secured to each of said longitudinal passages with the wall surface of said cathode in alignment with the wall of the passage,
   an anode secured in axial alignment with each of said longitudinal passages,
   an insulation means separating each of said cathodes from each of said anodes, and
   means for evacuation of said tube and for adding a gas filling into the tube.

2. A proportional counter tube as claimed in claim 1, wherein;
   said cathode and said anode for each of said longitudinal passages are made as one unit.

3. A proportional counter tube as claimed in claim 2, in which;
   a radiation collimator is secured juxtaposed said window in axial alignment therewith in order to collimate radiation which is incident on said window.

4. A proportional counter tube as claimed in claim 2, which includes;
   an electrical conductor guard ring that surrounds said anode and is spaced therefrom between the anode and said cathode.

5. A proportional counter as claimed in claim 4, which includes;

a radiation collimator secured juxtaposed said window in axial alignment therewith in order to collimate radiation which is incident on said window.

6. A proportional counter tube as claimed in claim 4, wherein;

the window of said tube is made of beryllium.

7. A proportional counter tube as claimed in claim 4, wherein;

each cathode is connected electrically in parallel to each other, each anode is connected electrically in parallel to each other, and each of said guard rings are connected in parallel to each other.

8. A proportional counter as claimed in claim 6, in which;

said window has a thickness of about 0.127 millimeter.

References Cited

UNITED STATES PATENTS 2,701,312    2/1955    Lord _____ 250—83.6
3,277,329   10/1966    Bernstein _____ 313—93

JAMES W. LAWRENCE, Primary Examiner.

P. C. DEMEO, Assistant Examiner.